Figure 4:
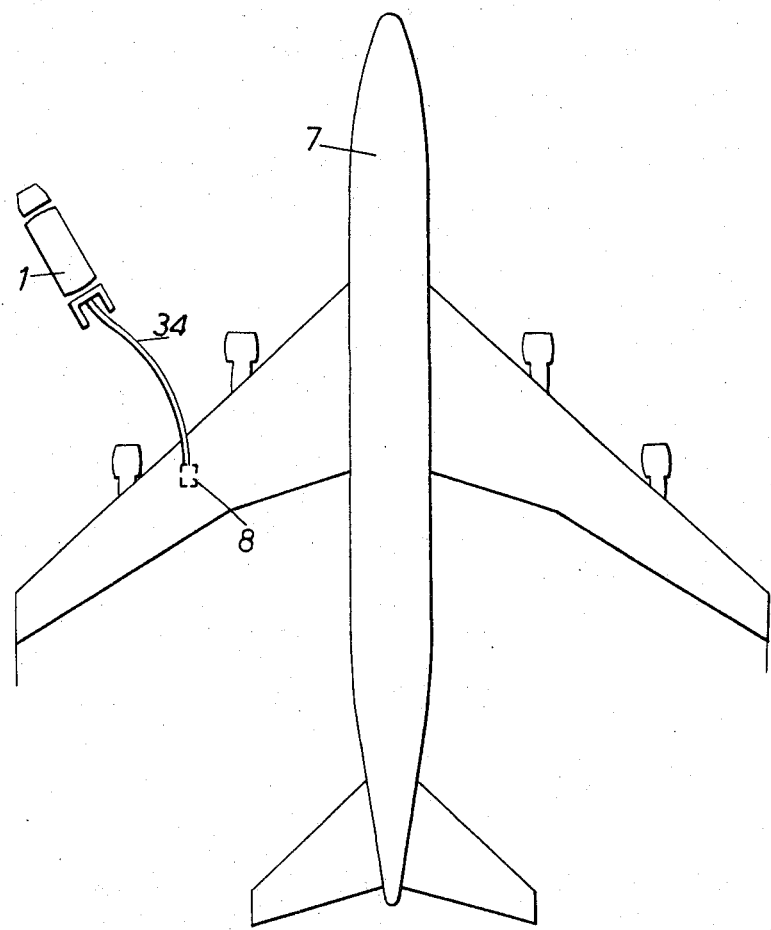

United States Patent [19]

Lentel

[11] 3,807,437
[45] Apr. 30, 1974

[54] REFUELLING VEHICLES

[75] Inventor: Francis Graham Lentel, Gloucestershire, England

[73] Assignee: Gloster Saro Limited, Gloucestershire, England

[22] Filed: June 16, 1971

[21] Appl. No.: 153,666

[30] Foreign Application Priority Data
June 16, 1970 Great Britain.................. 29,215/70

[52] U.S. Cl. .......................................... 137/355.12
[51] Int. Cl. ............................................. B65h 75/40
[58] Field of Search..... 137/355.12, 355.16, 355.17, 137/355.19, 355.26, 355.27, 355.2, 355.18, 355.28; 239/189, 190, 191

[56] References Cited
UNITED STATES PATENTS

| 3,250,437 | 5/1966 | Smith | 137/355.16 X |
| 2,063,727 | 12/1936 | Davis, Jr. | 137/355.26 X |
| 2,583,181 | 1/1952 | Kunz | 137/355.26 X |
| 2,735,717 | 2/1956 | Harman | 137/355.12 |
| 3,165,109 | 1/1965 | Hammelmann | 137/355.16 X |
| 3,335,766 | 8/1967 | Winger | 137/355.12 X |
| 3,467,301 | 9/1969 | Doyle et al. | 137/355.16 X |

Primary Examiner—Samuel Scott
Attorney, Agent, or Firm—Rose & Edell

[57] ABSTRACT

A refuelling vehicle assembly, especially for aircraft, in which the main vehicle transports a trolley that can be dismounted from the main vehicle, this trolley being self-propelling and steerable and carrying a hose on a hose-reel. The hose-reel is power driven through a free wheel clutch. The hose is in two lengths, the longer of which unreels from the free-wheeling hose-reel to extend between the main vehicle and the trolley as the trolley travels away from the main vehicle, while the shorter length is coupled to the aircraft refuelling point The two hose lengths are connected to one another by being coupled to opposite ends of a hollow hose reel axle.

5 Claims, 8 Drawing Figures

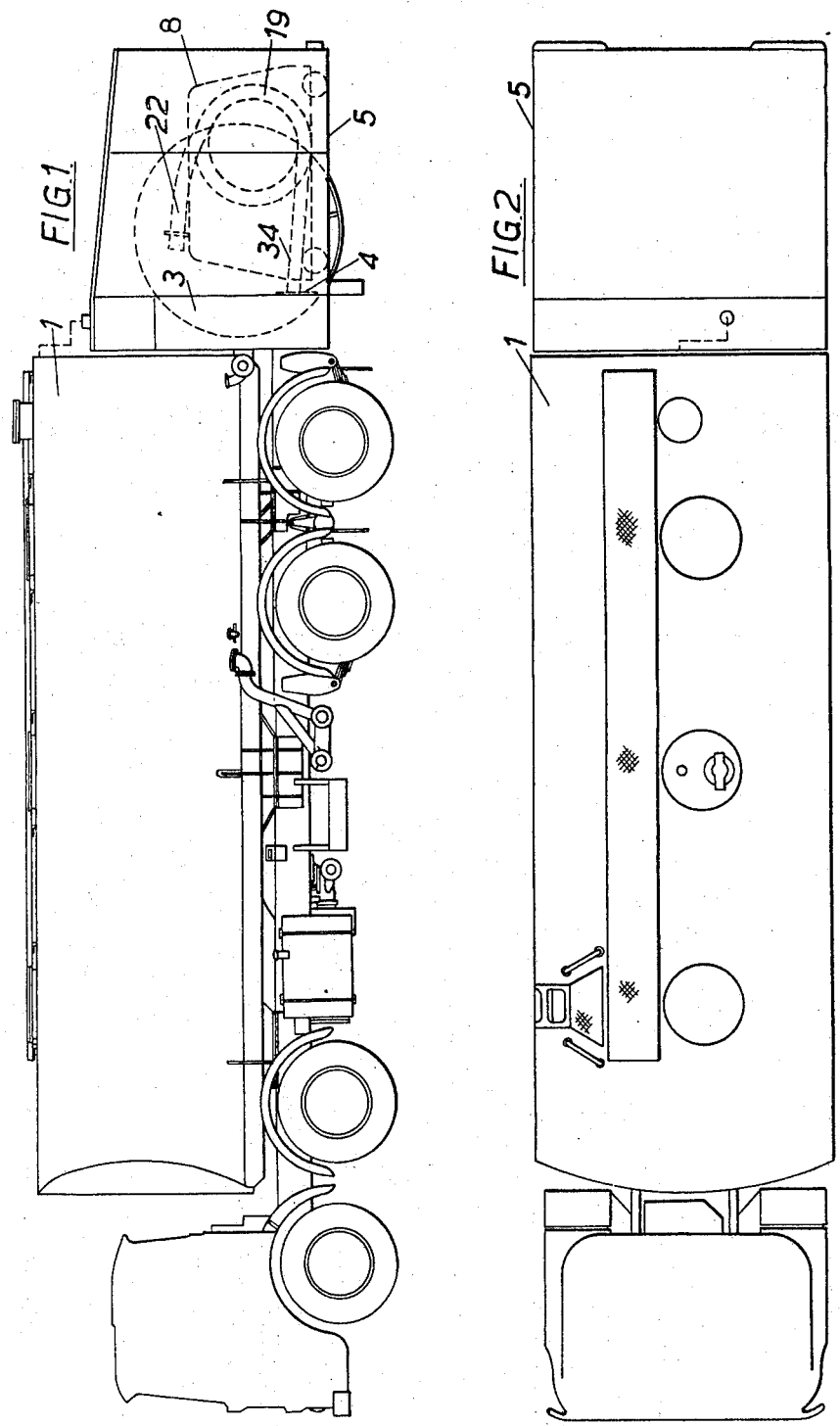

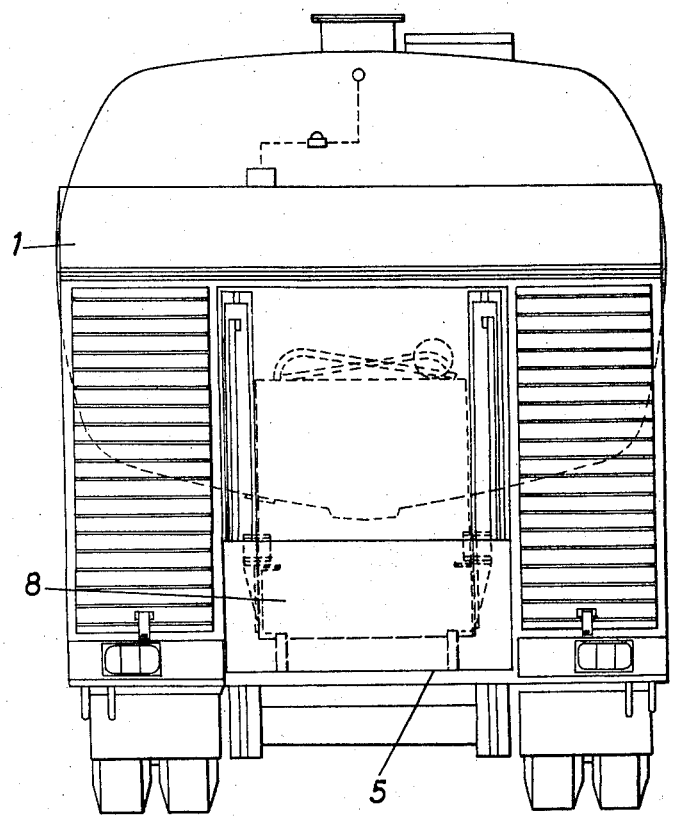

Inventor
FRANCIS GRAHAM LENTEL
By Rose & Edell
Attorneys

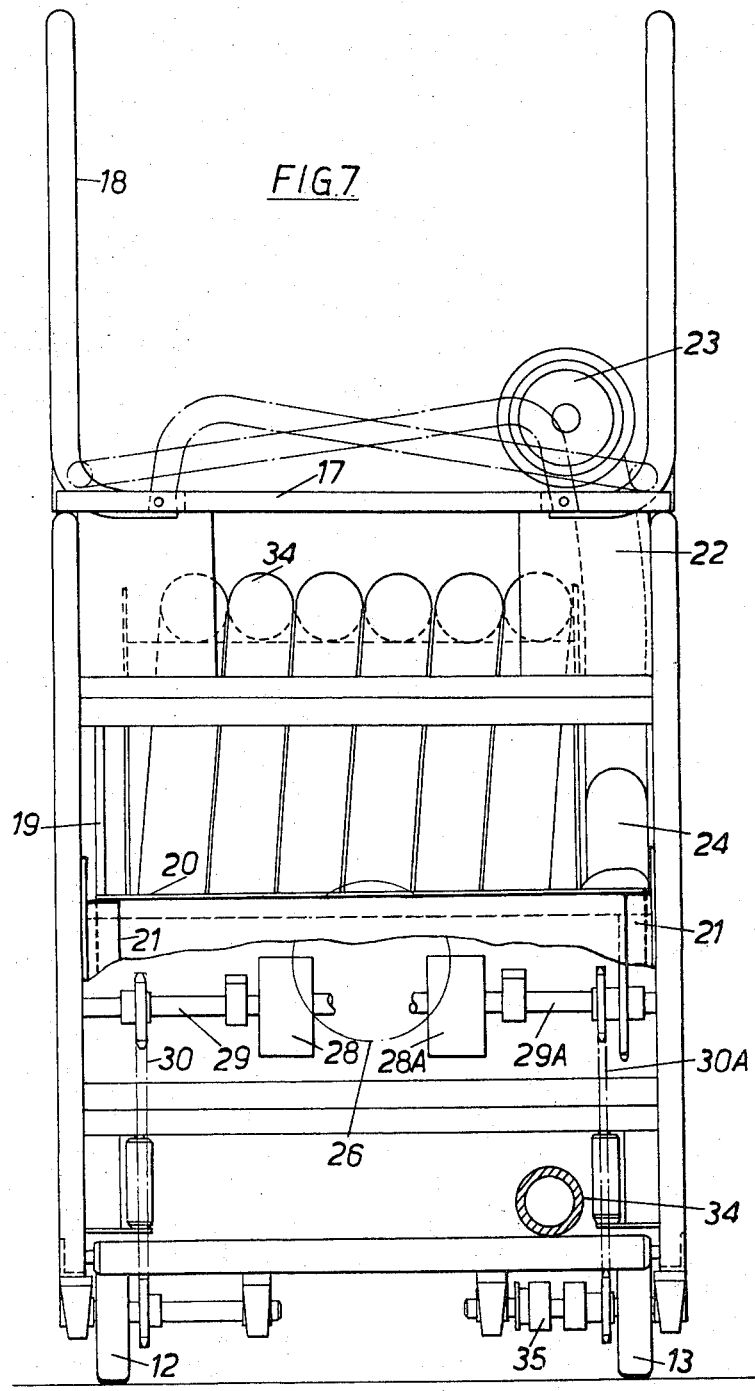

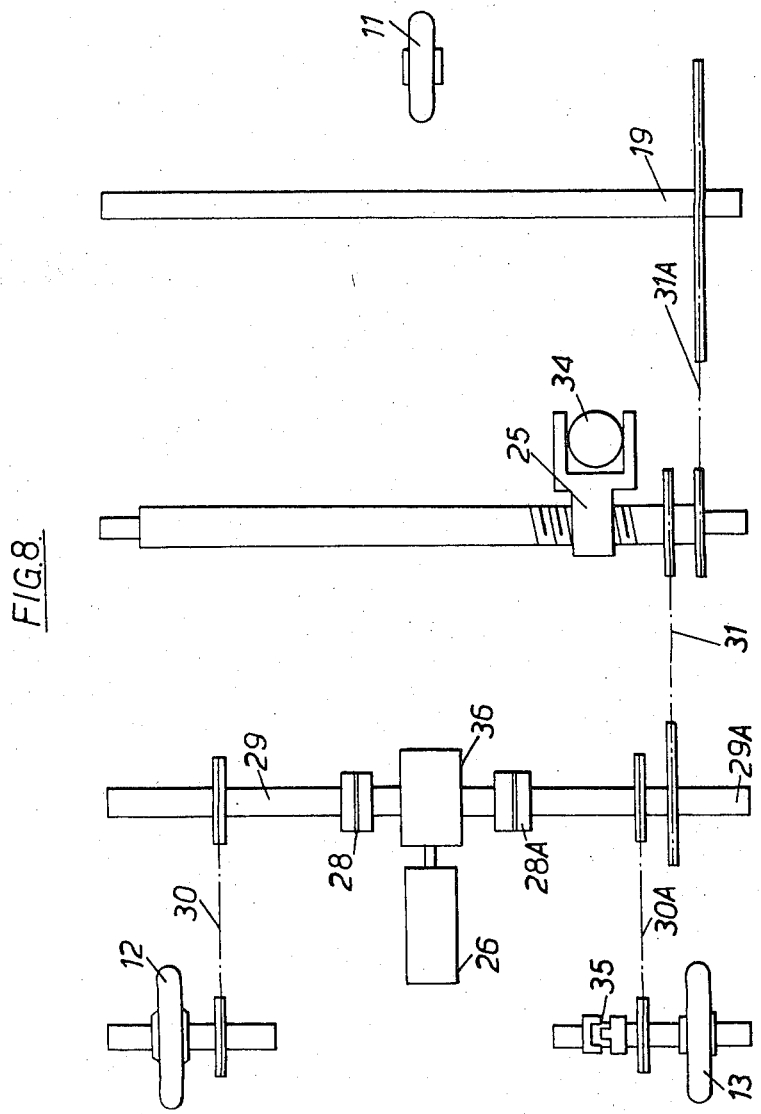

REFUELLING VEHICLES

This invention relates to refuelling vehicles and, in particular, vehicles used for the refuelling of aircraft.

It has been the practice for such refuelling vehicles to be positioned immediately below the aircraft wing, with only a comparatively short length of connecting hose being necessary between the wing tank refuelling point and the tanker. Whilst this has been acceptable practice up to the present time, the introduction of the very large capacity jet aircraft, commonly referred to as 'Jumbo Jets,' has introduced problems which no longer make it practicable or acceptable to use this method.

One of the main problems which has arisen is due to the large diameter underslung engines employed on such aircraft. Combined with this, the wing refuelling points are situated between two engines. However accurately the refuelling vehicle is driven, there is always the danger that a slight misjudgement of position could result in damage to the underslung engines or cowlings, causing undesirable delays. Again, larger aircraft, having greater fuel capacity, require larger refuellers and with the presence of many other servicing vehicles around the aircraft it may not be possible to manoeuvre into a convenient position.

With these problems in mind, Airport Authorities now insist that refuellers are kept at a clear distance from the aircraft. This necessitates the carrying of large diameter and heavy fuel hoses to the aircraft, and there is then the difficulty of reaching the wing refuelling point with the hose coupling, that point being a considerable height above ground level. It is therefore an object of the invention to overcome these difficulties.

According to the present invention, a hose-laying trolley is provided carried on and demountable from the main vehicle and upon which is reeled a large bore hose coupled to the vehicle, the trolley being arranged to pay out this hose as it travels from the remotely parked vehicle to an acceptable connection position. Thus, only the trolley and not the refuelling vehicle itself, is required to move in close to the refuelling point and, in the case of an aircraft, the small comparative size of the trolley removes the danger of imparting damage to the aircraft.

The trolley may be of such design and height that when positioned beneath the wing of an aircraft it can be employed as a platform facilitating extraction of the hose coupling from its stowed position on the trolley and connection of this coupling to the wing refuelling point.

Fuelling completed, the hose coupling is disconnected and restowed, the trolley, which is preferably motorized, then returns to the fuelling vehicle, automatically winding in the hose on to a reel or drum mounted within the trolley structure. A parking platform may be provided at the rear of the fuelling vehicle to receive the trolley. This platform can be arranged to perform an elevating function whereby the trolley is raised to a convenient position above ground level. The complete vehicle assembly thereby provides a self-contained fuelling unit transferable to any required part of an airport.

Figure 5:
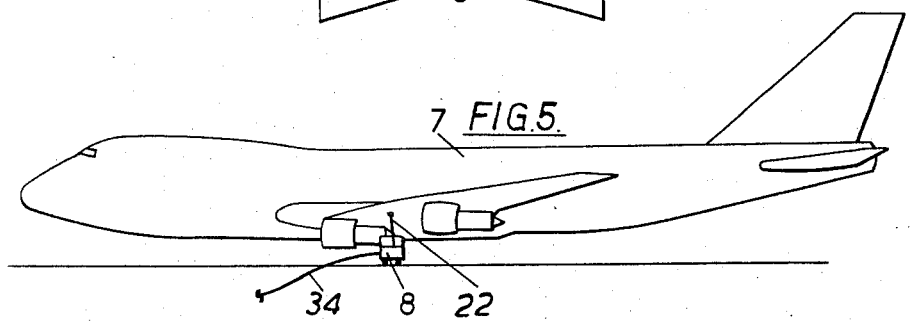
Figure 6:
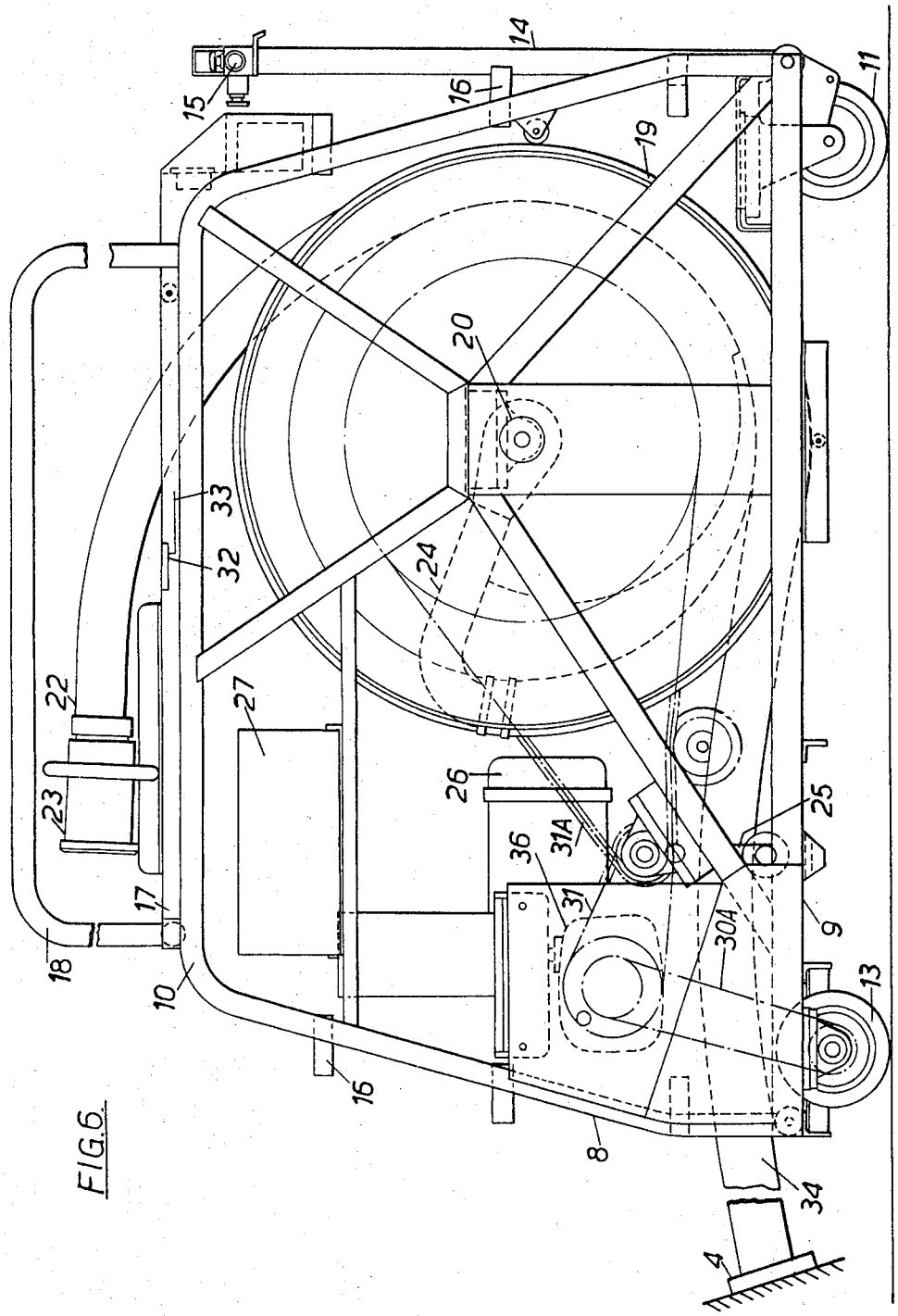

One arrangement in accordance with the invention will now be described by way of example, reference being made to the accompanying drawings in which:

FIGS. 1 to 3 are, respectively, a side elevation, a plan and a rear elevation, showing a fuelling vehicle with its combined hose-laying trolley, FIGS. 4 and 5 indicate, in plan and elevation, respectively, a possible disposition of fuelling vehicle to aircraft with the hose-laying trolley in its under-wing position, FIGS. 6 and 7 are, respectively, side and rear elevations showing the trolley in more detail, and FIG. 8 is a detail view of drive arrangements on the trolley.

Referring firstly to FIGS. 1 and 2, a refuelling vehicle 1 has, at its rear end, an elevating and lowering platform 5 on which is mounted, to form a self-contained unit, a hose-laying trolley 8. The platform shown here in its raised position can be lowered to ground level permitting the trolley to move away from the fuelling vehicle. The fuel hose 34 stored on a hose reel within the trolley is rigidily attached at 4 to the fuel delivery and metering equipment 3 on the fuelling vehicle.

FIGS. 4 and 5 illustrate the possible disposition of the refuelling vehicle 1 relative to an aircraft 7, and the location of the hose-laying trolley 8, during refuelling of the aircraft.

Referring now to FIGS. 6 to 8, the hose-laying trolley 8 is a self-contained electrically operated vehicle having a metal framework 10 rigidly attached to chassis members 9. The structure is mounted on two fixed-axle wheel assemblies 12 and 13 at the rear end and one steerable wheel 11 at the forward end. Steering is effected by use of a hinged steering arm 14, which also carries the necessary operating controls 15 and which can be raised or lowered as required. The steering arm, when in the upright stowed position or lying on the ground, activates a parking brake which is applied to the wheel 11.

Additions to the structure include steps 16 at the front and rear of the vehicle, providing access to a platform 17 equipped with folding hand rails 18. Contained within the framework 10 is a hose reel unit 19 having a built-up axle 20, which axle, mounted by suitable bearings on fixed spigot hubs 21, allows the hosewheel to free-wheel, only the hubs 21 being rigidly attached to the sides of the hose trolley. Two lengths of flexible hose are employed. A short length 22 has at one end a refuelling coupling 23 for connection to the aircraft while its other end is connected to the outer end of a rigid short pipe 24 rotatable about the hosewheel axle and itself having a connection by means of a fuel-tight sealed joint to the axle which is hollow to permit the passage of fuel. The hose 22 can be pulled out ready for attachment to the aircraft wing fuelling point, and if the fuelling point is at a high level the hose can be held against its own weight by a clamp 33 operated by a foot pedal 32, both set within the platform 17.

For low level fuelling the hose is unclamped and the coupling 23 pulled upward and rearward, extracting the length of hose 22 required which is then guided through the gap in the top rail to emerge from the side of the trolley.

A longer length of flexible hose 34, of sufficient length to cover the distance between the main fuelling vehicle and the aircraft, is wound around the hose reel, the lay on the reel being controlled by an automatic hose-laying device 25. One end of the hose 34 is, as already described, rigidly connected at 4 to the fuelling vehicle metered delivery point. The other end is rigidly connected to the fuel-carrying axle 20 at the end opposite the connection of the pipe 24.

The drive of the trolley is by an electric motor 26 supplied by two batteries 27. The motor powers the rear wheel 12 via a gear box 36 and a clutch 28 mounted upon a half shaft 29. A chain drive 30 connects the half shaft 29 to the driving wheel 12. For reeling in the hose, a second clutch 28A and half shaft 29A drives the hose-laying device 25 and hose reel 19 through chain drives 31, 31A. The inter-connection of the hose reel drive and the trolley groundwheel drive through the gearbox 36 ensures that the rate of hose feed on to the reel is controlled in accordance with the travel of the hose trolley toward the fuelling vehicle. When paying out the hose the clutch 28A is disengaged allowing the hosereel to free-wheel.

In the event of power failure after the hose has been reeled out, the clutches 28, 28A are disengaged and an emergency clutch 35 can be engaged to couple the wheel 13 through a chain drive 30A to the half shaft 29A. The trolley is then propelled manually by pushing on the steering arm 14, the hose-laying gear being operated from the rear wheel 13 via the emergency clutch 35.

Although this invention is particularly useful in connection with aircraft refuelling and has therefore been described in that context, there are other applications in the general commercial field where normal tanker vehicles may have difficulty in access but where such a trolley can deliver a supply (or suction) hose into position.

What I claim is:

1. A refuelling vehicle, especially for aircraft, provided with a hose-laying trolley carried on and demountable from a main tanker truck, the trolley being arranged to pay out a hose as it travels, from the remotely parked main truck to a convenient position for connection of the hose to the aircraft, said trolley being steerable and motorized for self-propulsion and being of such design and height and having provided thereon floor means such that when positioned beneath the wing of an aircraft it can be employed as a platform for reaching the wing refuelling point, and wherein the hose comprises a shorter length to run from a hose reel on said trolley to the refuelling point on the aircraft, and a longer length to extend from the trolley to the main truck, the two lengths being connected to opposite ends of a hose-reel axle which is hollow so as to pass fuel between them.

2. A vehicle according to claim 1, wherein the shorter hose length is connected to the hose-reel axle by means of a rotary sealed joint.

3. A vehicle according to claim 2, wherein a pedal-operated clamp is provided on the trolley to support the weight of the shorter length of hose when connected to a high refuelling point.

4. A vehicle according to claim 2, wherein the hose-reel is power driven in synchronism with a ground wheel of the trolley and has an automatic hose-laying device, whereby the longer length of hose is automatically reeled in as the trolley travels toward the main truck, the power driving connections to the hose-reel including a clutch so that the drive can be disengaged to allow the hose-reel to free-wheel as the hose is paid out.

5. A vehicle according to claim 4, provided with clutch means operable, in the event of power failure, to disengage the trolley ground wheel from the drive and to couple the hose-reel to be driven by one of the ground wheels.

* * * * *